United States Patent
Höller et al.

(10) Patent No.: US 7,310,665 B2
(45) Date of Patent: Dec. 18, 2007

(54) METHOD, GATEWAY SYSTEM AND ARRANGEMENT IN A COMMUNICATION NETWORK

(75) Inventors: Jan Höller, Stockholm (SE); Göran Eriksson, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 747 days.

(21) Appl. No.: 09/837,493

(22) Filed: Apr. 18, 2001

(65) Prior Publication Data

US 2001/0034784 A1   Oct. 25, 2001

(30) Foreign Application Priority Data

Apr. 20, 2000   (EP) ................... 00850070

(51) Int. Cl.
*G06F 15/173* (2006.01)
*G06F 15/16* (2006.01)

(52) U.S. Cl. .................... 709/223; 709/231
(58) Field of Classification Search ............. 709/216, 709/223, 227, 228, 231, 232, 233, 225, 229, 709/205, 238; 713/158
See application file for complete search history.

(56) References Cited

U.S. PATENT DOCUMENTS

| | | | | |
|---|---|---|---|---|
| 5,768,527 A * | 6/1998 | Zhu et al. | ..................... | 709/231 |
| 5,974,446 A * | 10/1999 | Sonnenreich et al. | ........ | 709/204 |
| 5,996,022 A * | 11/1999 | Krueger et al. | .............. | 709/247 |
| 6,155,840 A * | 12/2000 | Sallette | ......................... | 434/323 |
| 6,185,620 B1 * | 2/2001 | Weber et al. | ................. | 709/230 |
| 6,421,733 B1 * | 7/2002 | Tso et al. | ..................... | 709/246 |
| 6,452,924 B1 * | 9/2002 | Golden et al. | ............... | 370/352 |
| 6,553,410 B2 * | 4/2003 | Kikinis | ......................... | 709/218 |
| 6,594,699 B1 * | 7/2003 | Sahai et al. | ................... | 709/228 |
| 6,631,410 B1 * | 10/2003 | Kowalski et al. | ............ | 709/224 |
| 6,697,365 B1 * | 2/2004 | Messenger | .................... | 370/390 |
| 6,711,622 B1 * | 3/2004 | Fuller et al. | ................. | 709/231 |
| 6,717,607 B1 * | 4/2004 | Lauper et al. | ............ | 348/14.08 |
| 6,760,916 B2 * | 7/2004 | Holtz et al. | .................... | 725/34 |
| 6,795,863 B1 * | 9/2004 | Doty, Jr. | ...................... | 709/231 |
| 6,845,398 B1 * | 1/2005 | Galensky et al. | ............ | 709/231 |
| 6,909,903 B2 * | 6/2005 | Wang | ....................... | 455/456.1 |
| 6,996,768 B1 * | 2/2006 | Elo et al. | ..................... | 715/500 |
| 2002/0103935 A1 * | 8/2002 | Fishman et al. | ............. | 709/246 |

FOREIGN PATENT DOCUMENTS

| | | |
|---|---|---|
| EP | 0 762 789 A2 | 3/1997 |
| EP | 0 762 789 A3 | 3/1997 |

(Continued)

OTHER PUBLICATIONS

European Search Report prepared in connection with patent application No. EP 00850070.4 (priority application) with a mailing date of Oct. 2, 2000.

(Continued)

*Primary Examiner*—Ario Etienne
*Assistant Examiner*—Sargon N Nano

(57) ABSTRACT

The present invention relates to multimedia communication between end systems in IP environments and more particularly it relates to the problem that all services concerning processing of media streams are bundled.

The solution, according to the invention is a communications system in which a service is publicly available by any end system via a published Uniform Resource Identifier (URI).

34 Claims, 4 Drawing Sheets

FOREIGN PATENT DOCUMENTS

| | | |
|---|---|---|
| EP | 0 992 922 A2 | 4/2000 |
| WO | WO 95/30317 | 11/1995 |
| WO | WO 98/43177 | 10/1998 |

OTHER PUBLICATIONS

Search report prepared by WPT Searches and Consulting concerning invention titled, "Service Assembly in an IP-network" with a mailing date of Apr. 11, 2000.

Ramjee et al.: The use of network-based migrating user agents for personal communication services, 1995 IEEE Personal Communications, vol. 2, No. 6, pp. 62-68, ISSN: 1070-9916.

Lombardo et al.: Performance evaluation of an allocation strategy for TINA-compliant mobile agents supporting PCS in a multi-retailer environment, 1999 Intelligence in Services and Networks. Paving the Way for an Open Service Market, pp. 401-415, ISBN 3540658955, Apr. 27-29, 1999.

Guedes et al.: QoS agency: an agent-based architecture for supporting quality of service in distributed multimedia systems, 1997 IEEE Conference on Protocols for Multimedia Systems—Multimedia Networking PROMS—MnNet (Cat. No. 97TB100116), pp. 204-211, ISBN 08 1 8679166, Nov. 24-27, 1997.

Seitz et al.: Management of proxy objects providing multimedia applications in the mobile environment, Integrated Network Management VI, Distributed Management for the Networked Millennium, Proceedings of the Sixth IFIP/IEEE International Symposium on Integrated Network Management. (Cat. No. 99EX302) pp. 915-928, ISBN 0780357485, pp. 24-28 May 1999.

La Porta et al.: Experiences with network-based user agents for mobile applications, 1998 Mobile Networks and Applications, vol. 3, No. 2, pp. 123-141, ISSN 1383-469X.

Bharadvaj, H. et al. "An Active Transcoding Proxy to Support Mobile Web Access", pp. 118-123, IEEE 1998; XP-002147478.

* cited by examiner

METHOD, GATEWAY SYSTEM AND ARRANGEMENT IN A COMMUNICATION NETWORK

FIELD OF INVENTION

The present invention relates to a gateway system, a method and an arrangement in a digital conversational multimedia communication system in Internet Protocol (IP) environments. More specifically it relates to networked application infrastructure services.

DESCRIPTION OF RELATED ART

In existing communication models, the network centric approach is the dominant one. The network centric approach traditionally implies that services are provided by the network in a monolithic fashion, and the one who owns the network owns the services. The implication is that the terminal and the end system are restricted to use the services offered basically by one or a few operators, and as such mainly on subscription basis. The system service is typically a bundling of a set of supporting network services, you get everything or nothing. The bundling is typically done in the switching systems e.g. local exchanges, Mobile Switching Centre (MSC), etc. There is no or little freedom to choose the best available service provider for these supporting network services on a call by call or session by session basis. For example, a subscriber to a telephony service is more or less restricted of his phone service provider to use any gatewaying services to other networks, transcoder services, bridging services for conferences etc.

A Gateway is a network node in a communications network, equipped for interfacing with another network that uses different protocols. The gateways mentioned here interconnect higher layers than the link and network (IP) layer. It usually supports address mapping and may also provide transformation of the data between the networks to support end to end application connectivity.

In a deregulated market, a multitude of service providers of all sorts of services, not only the "obvious ones" are expected to be available on the market. This requires that the monolithic services of today are broken apart into their constituent parts and then made available as separate services.

There are ways to control media gateways today, but these mechanisms rely on a master-slave relationship, i.e. he who wishes to make use of the media gateways must also be the actual owner of the resources. Ownership is defined as a configuration issue, and is not done on a call to call basis. One such mechanism is the megaco protocol, draft-retf-megaco-protocol-07.txt, the Internet Engineering Task Force (IETF)/H.248 of International Telecommunication Union—Telecommunication Standardization Sector (ITU-T).

Examples of such network-supported services are:

Transcoder services, for e.g. speech, audio, and video.
Conference units and audio/video media mixers.
Security proxies e.g. trusted security proxies for encryption and decryption.
Other application layer gateway services.

Note that the service processes a media stream that is not necessarily finite in time or size, but it really applies to a stream. Compare the difference to sending a file to a server to perform a file conversion. Also real-time characteristics are generally required by the media processing function. A typical characteristic of a stream is that the receiver starts viewing or listening to it before the sender has ceased to transmit.

Therefore, what is further needed is a way of making these services unbundled so that they may be accessible by anybody as well as provided by anybody as separate services.

SUMMARY OF THE INVENTION

The present invention relates to multimedia communication between end systems in IP environments.

More particularly it relates to that all services concerning processing of media streams are bundled. When you get a subscription from one service provider, you are more or less forced to use the services of that provider. The service in question typically only provides services to subscribers of that service provider.

Accordingly, it is an object of the present invention to unravel the above-mentioned problem.

Particularly it is an object to unbundle the services to be considered as separate services and to unbundle these services from the end-user application services.

The solution, according to the invention is a communications system in which the service is publicly available by any end system via a published Uniform Resource Identifier (URI).

A method for controlling processing of streaming media used in inter-personal communication services, sent from a second end system over an IP network, via a gateway system, over the IP network to a first end system by means of the gateway system providing a service of streaming media processing said service being independent of the end user application control, the gateway system comprising a gateway controller having a Uniform Resource Identifier (URI) which is known to any potential service user, such that the gateway system is available for external control by any potential service user, through the gateway controller, according to a first aspect of the invention, includes the steps of:

the first end system addressing the gateway controller In a first path, for the purpose of continuing the service by configuration and activation, by means of the known URI;

processing the streaming media in a second path that is separate from the first path, in such a way that the data is processed and forwarded to the first end system continuously without having received the complete media stream before starting the processing.

A method according to this first aspect of the invention is hereby characterised by what are the features of claim 1.

According to a second aspect, the invention can be implemented by software code segments and e.g. be stored in any of the relevant entities of a communication system, such as an end system or terminal, a gateway controller, a gateway etc. The computer program product is directly loadable into the internal memory of a digital computer within said entities and includes the software code portions for performing the steps of the method according to the invention, when said program is run on a computer. A computer program product according to this second aspect of the invention is hereby characterised by what are the features of claim 10.

According to a third aspect of the invention the computer program product is stored on a computer usable medium, comprising readable program for causing a computer, within an entity in the communications system according the invention, to control an execution of the steps of the method according to the invention. A computer program product according to this third aspect of the invention is hereby characterised by what are the features of claim 11.

A communications system for processing streaming media used in inter-personal communication services, according to a fourth aspect of the invention includes a first entity, a second entity and a service providing gateway system all being connected to an IP network within the communications system, characterised in that:

the gateway system is adapted to provide a service of streaming media processing, said service being independent of the end user application control, the first entity, the second entity and the gateway system, the gateway system has means for processing a streaming media, sent from the first entity via the IP network to the second entity, in such a way that the data is processed and forwarded to the first end system continuously without having received the complete media stream before starting the processing the gateway system comprises a gateway controller adapted to control the service by configuration and activation, said controller having a Uniform Resource Identifier (URI) which is known to any potential service user, including the first entity, such that the gateway system is available for control by any potential service user, through the gateway controller.

A communications system according to this fourth aspect of the invention is hereby characterised by what are the features of claim 12.

A gateway system according to a fifth aspect of the invention is connected to an IP network. The gateway system offers a service of processing a media stream sent between end systems connected to the IP network. The gateway system includes a gateway that has means for processing the media stream sent from a first end system via the IP network to a second end system. The gateway system further includes a gateway controller that manages the gateway. The gateway controller has a URI. The gateway system is made known to any potential service user, via a Uniform Resource Identifier (URI) of the gateway controller. The gateway system has means for being configured by any end system.

A communications system according to this fifth aspect of the invention is hereby characterised by what are the features of claim 19.

An advantage of the present invention is freedom of choice for all types of services. Examples of services supported by the gateway and gateway controller system using the present invention are audio and video transcoding, transmedia coding (e.g. text to speech), audio or video mixing devices, and trusted security services such as anonymizers.

Another advantage of the present invention is that a full end-system choice of service is possible without being a subscriber to a particular service provider.

Another advantage of the invention is that it makes it possible for any end system to access the service.

Another advantage of the invention is that the service can be made independent of the end-user application in which it is used. For example, a video transcoding service may equally well be used in a video telephony application, or in a video streaming ("web-TV") application. This means a high degree of service reusability as well as a removing the need to develop that service specifically as part of a particular application.

Another advantage of the present invention is that more services become available to choose between and the probability to find a suitable service for a specific call or session is increased. The end-user can also choose a service that costs as much as he is willing to pay.

Yet another advantage is that service providers may select the best of service systems from suppliers that suit their individual needs. They are hence not limited to monolithic or bundled systems from a few suppliers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENTS

The invention relates to conversational multimedia communications including a media stream. The media stream here is defined as a stream of information that is continuously transferred and is not necessarily finite in time or size. A stream is characterised by that the receiver is processing and interpreting the information before the sender has ceased sending it. Example of a media stream is real time information, voice, music, video conference, etc. Example of not being a media stream is sending a file to a server for conversion, down loading of a video film from a server on Internet and after the download look at the film, etc.

Figure 1:
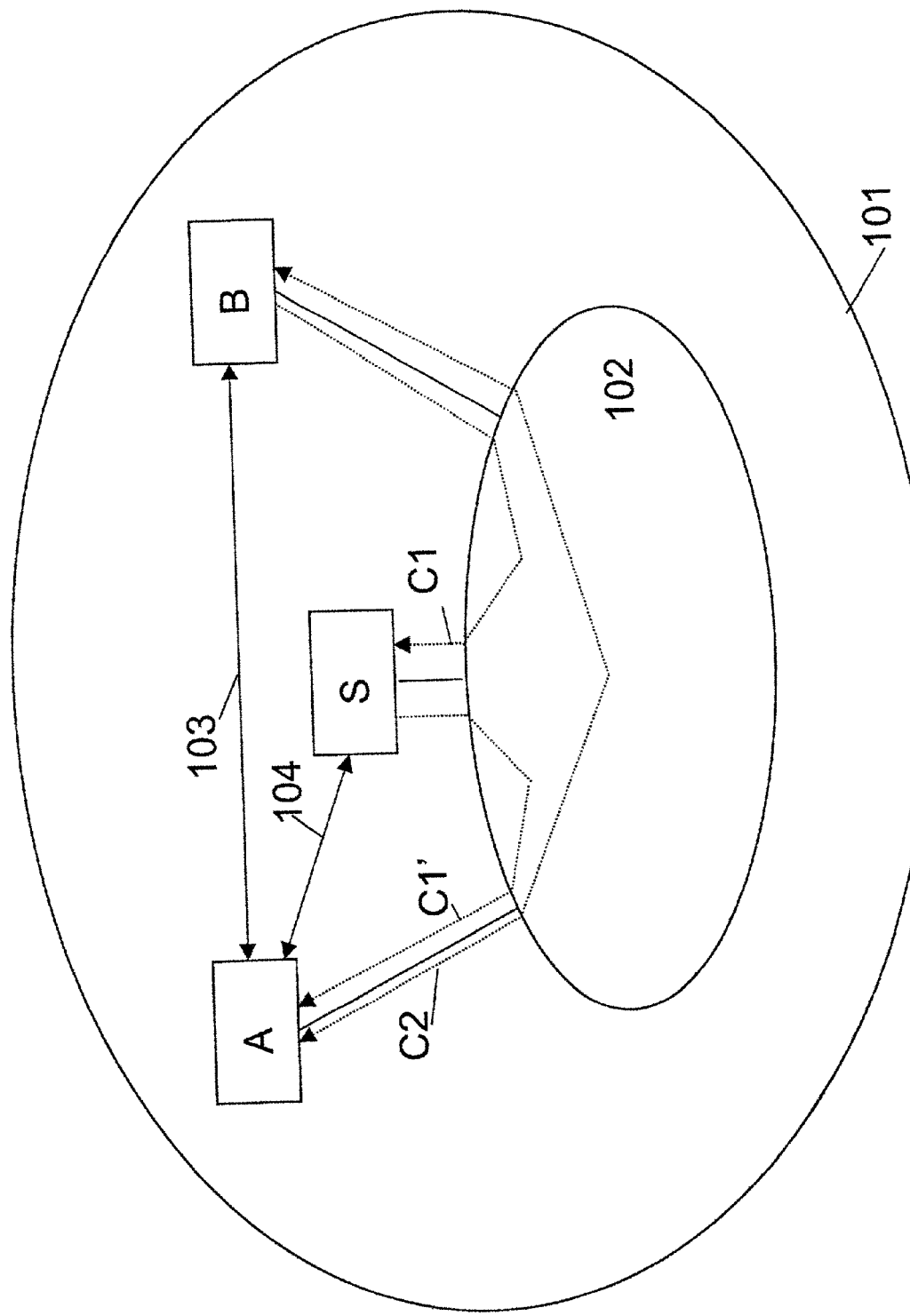
FIG. 1 shows a schematic block diagram of the communications system according to the invention.

FIG. 1 shows a communications system 101 according to the invention. The communications system 101 includes a first entity A and a second entity B, the first entity A being a mobile terminal and the second entity being an end system or end user serving terminals. Both entities being involved in the same session. The first entity A and the second entity B have both a respectively digital computer, each computer having an internal memory for storing a computer program, not shown in the figure. The session in this fictitious example has two media components, C1 and C2, e.g. voice and video that are to be transferred from the second entity B, over an IP network 102 to the first entity A, within the communications system 101. In the session establishment 103, the first entity A and the second entity B have negotiated specific formats for the voice and video streams, e.g. Global System for Mobile communication (GSM) voice and Motion Pictures Expert Group 2 (MPEG2) video. In this example the second entity B can only support MPEG2 video C1, whereas the first entity A is a mobile terminal that has a small screen and can only handle H.261 video. H.261 is a video codec standard protocol for audio-visual services at rates of px64 kbit/s. Nevertheless the first entity A has agreed to letting the second entity B transmit the video in the MPEG2 format. To handle this, a transcoding service is required that transcodes MPEG2 to H.261 video. The voice stream C2 which is typically bi-directional is in this example left unmodified end to end between the second entity B and the first entity A that is depicted in FIG. 1. The A to B session invitation and negotiation 103 may for example be done using standard Session Initiation Protocol/Session Description Protocol (SIP/SDP) procedures. SIP is an application layer protocol for creating, modifying and terminating sessions with one or more participants. These sessions include Internet multimedia conferences, Internet telephony calls and multimedia distribution. SDP is a protocol intended for describing multimedia sessions for the purpose of session announcements, session invitation, negotiation and other forms of multimedia session control. The communications system 101 also includes a gateway system S providing a service of streaming media processing. This service is independent of the end user application control. In this example the service is transcoding of MPEG2 to H.261 video.

Figure 2:
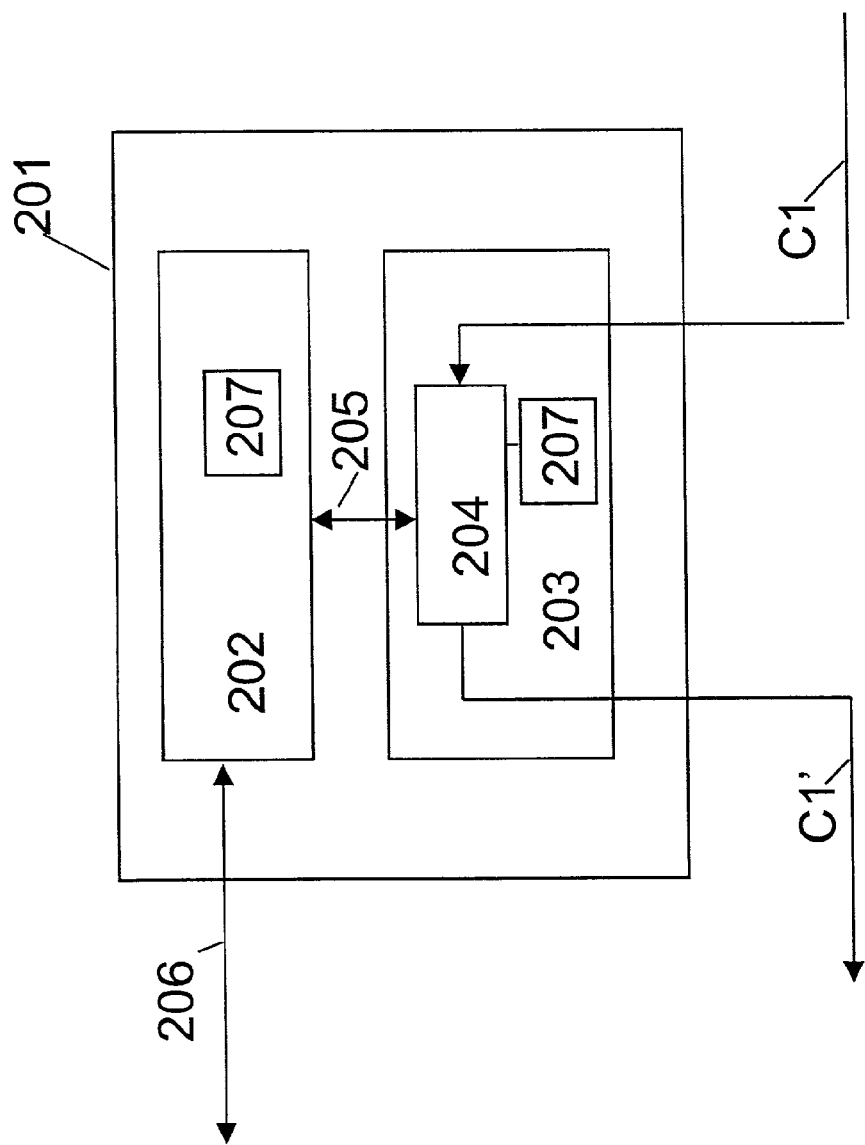
FIG. 2 shows a schematic block diagram of a gateway system according to the invention.

The gateway system S will now be described in more detail supported by the block diagram showed in FIG. 2. The gateway system, which is referred to as 201 in FIG. 2, comprises a gateway controller 202 and a gateway 203. These two entities can be co-located in the same node or be two separate nodes, each separately connected to the IP network. They are both connected to the IP network (see 102 in FIG. 1) and each typically has an IP address. The gateway system 201 is available for external control through the gateway controller 202. The gateway controller 202 is publicly available via its published Universe Resource Identifier (URI) e.g. service@domain. The URI can e.g. be published on a homepage on the Internet. The gateway has means 204 for processing the media stream C1, i.e. in this example transcode MPEG2 C1 to H.261 C1' video. The invocation 104 takes place on a path between the gateway system S and the first entity A that is separate from the path used for the media stream C1' between the gateway system S and the first entity A, thus unbundling the actual service control from the media stream completely. The gateway controller 202 manages the gateway 203. The communication 205 between the gateway controller 202 and the gateway 203 may e.g. be according to IETF megacop/ITU-T H.248. (megacop=Media Gateway Control Protocol=H.248). The gateway 203 and the gateway controller 202 each has a digital computer having an internal memory for storing a computer program 207.

The first entity A separately, i.e. outside the A to B session 103, invokes 104 a separate transcoding service by the gateway system S that transcodes MPEG2 to H.261 video. This is shown in FIG. 1.

This example will show a unidirectional flow, but a bi-directional flow is also possible.

The first step is to configure the service. That is done with one or more service requests sent in a control protocol 206 from the first entity A to the gateway controller 202. The control protocol may be based on SIP or SDP. It is also possible to send the service request in the same message exchange as the A to B session invitation. The gateway controller 202 is addressed using a URI in the form service@host e.g. transcoder@services.oprator.com in the request. In the case a control protocol 206 being based on SIP and SDP, the URI would be used in the SIP Uniform Resource Locator (URL) according to known practice in the format sip:service@host. The service request typically contains information about type of service, e.g. transcoding from MPEG2 to H.261. The service request(s) also contains information about the address to which the stream should be sent, e.g. IP address and port number of first entity A and other necessary address information pertaining to the entities A and B and the associated media stream.

One or more responses 206 to the service request(s) including the necessary address information, pertaining to the gateway system S and gateway 203, of relevance to the associated media stream may be exchanged. This includes the address information about the inlet to the gateway 203 in the form of an IP address and a port number.

At this stage the service is configured. The response(s) typically also indicate the result of the configuration requests, such as success or failure.

The next step is the actual activation of the service. This is indicated by the service activation request of 206.

It is fully possible that the service configuration and service activation may be bundled in one and the same request. It is also fully possible that configuration is done in parts using steps of several requests and responses.

The second entity B starts transmitting the media stream C1. The video stream C1, in MPEG2 format, is transferred over the IP network 102, through the assigned port of the gateway 203 and is processed by the means for processing i.e. the transcoder from MPEG2 to H.261 video. The media stream C1' in H.261 video format is then transferred, over the IP network 102, to the assigned port of the first entity A. The voice stream C2 is transferred unmodified over the IP network between the entities.

Figure 3:
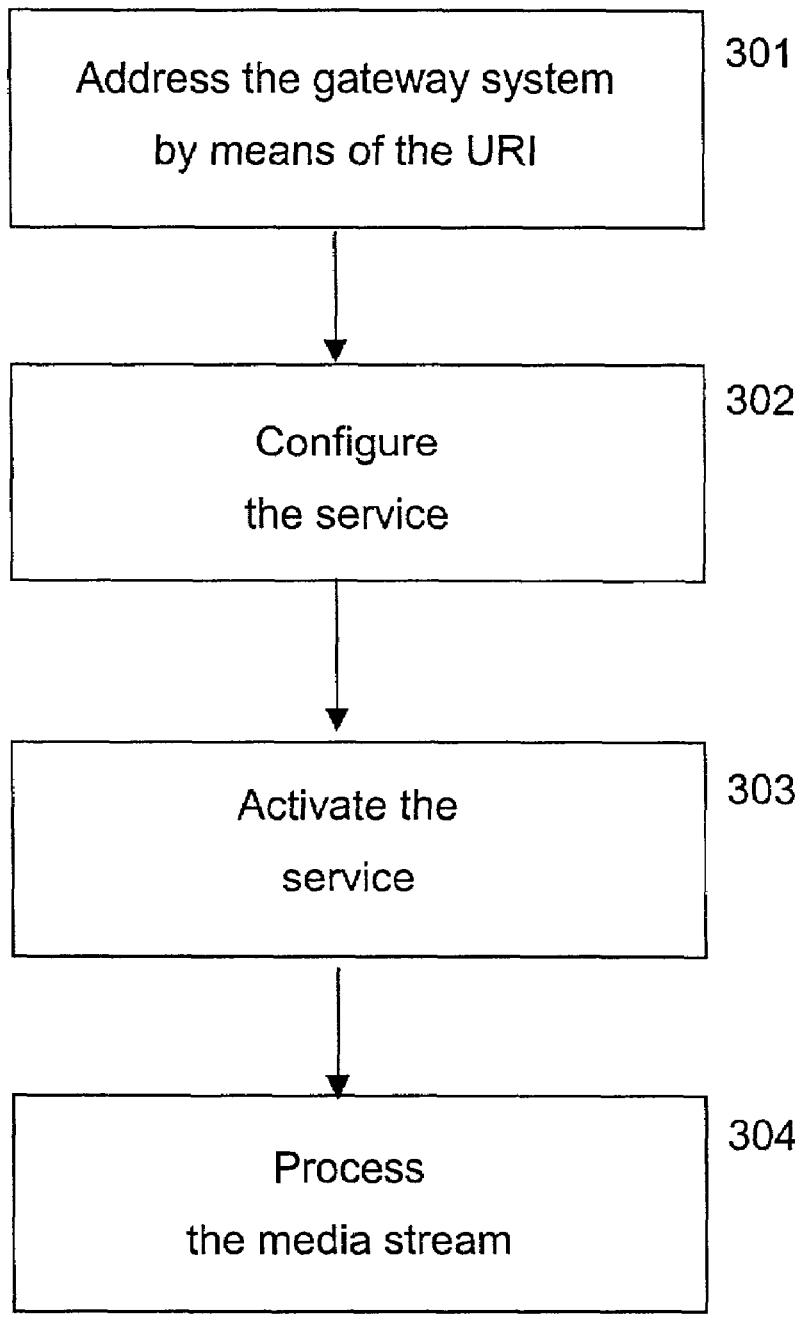
FIG. 3 shows a flowchart of the method according to the invention.

FIG. 3 shows a flowchart of a possible scenario of processing a media stream transferred from a first end system via a gateway system to a second end system within a communications system.

The method includes the following steps:

301. An end system shall make a call to another end system. For this specific call the end system wishes to use a service provided by the gateway system for processing a media stream to be transferred. The gateway controller is addressed by the end system in a first path by means of the known URI This is for the purpose of controlling the service by configuration 302 and activation 303.

304. Then the transmitting side sends its media stream, which is processed in the gateway system on the way to the receiving side. streaming media is processed in a second path that is separate from the first path, in such a way that the data is processed and forwarded to the other end system continuously without having received the complete media stream before starting the processing.

The method is implemented by means of a computer program product comprising the software code portions for performing the steps of the method. The computer program product is run on a computer stored in a digital computer within the end system and in the gateway system.

The computer program is loaded directly or from a computer usable medium, such as floppy-disc, CD, Internet etc.

Figure 4:
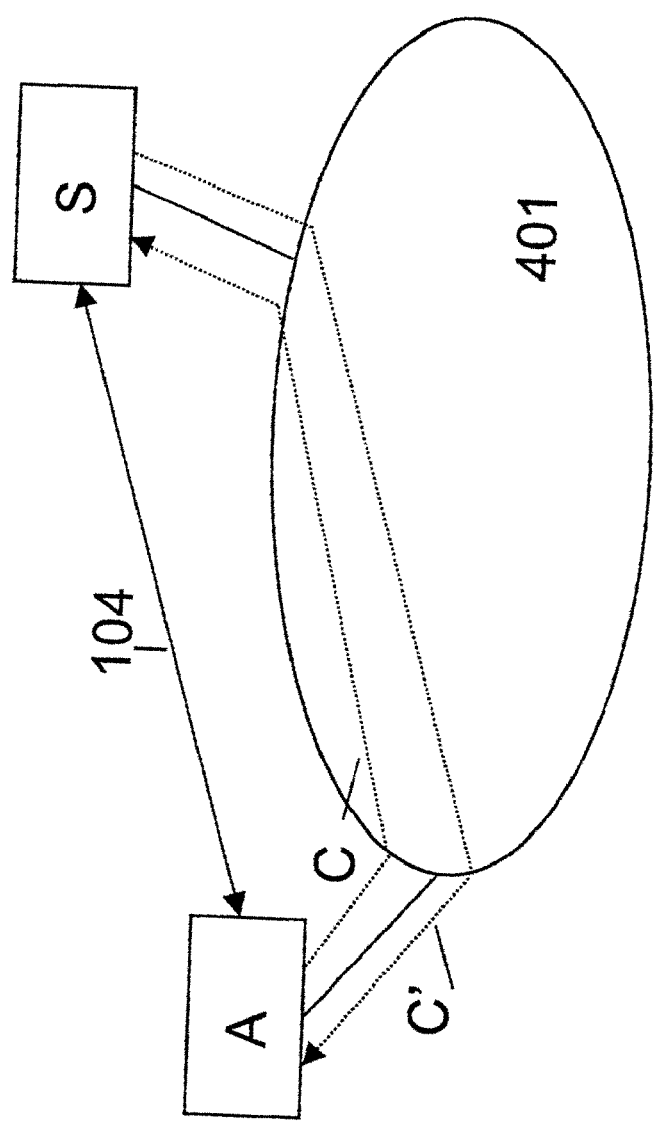
FIG. 4 shows a schematic block diagram of a scenario according to the present invention.

The method above can also be performed in another possible scenario shown in FIG. 4. In this scenario, the end system A requires to process a media stream C. A sends the media stream C over the Internet 401 to a gateway system S in which the media stream is processed and forwarded to A.

An example of this is if the end system A may be listening to a radio broadcast that it wishes to record parts of. Which part to record is not known beforehand. The end system A prefers to store the recorded format of MPEG1, layer 3 (MP3) due to internal memory limitations, whereas the radio broadcast is available in 44,1 kHz Pulse Code Modulation (PCM) in stereo. The end system A then continuously sends the 44,1 kHz PCM stream C to the service system S, which in this case constitutes an MP3 compressor system. The service system S returns MP3 in streamed format C' to the end system A. A may then record selected parts in MP3 format as A listens to the radio broadcast.

The invention claimed is:

1. A method of processing a media stream in a communications system that includes an Internet Protocol (IP) network, the method comprising the steps of:
   configuring a service for providing the media stream to a first entity, by sending a service request to a gateway controller, having a first IP address, the service request including information relevant to the first entity:
   initiating the media stream for a session between the first entity and a second entity, with the first entity receiving, and the second entity sending the media stream via a data path that includes a gateway coupled to the IP network, the gateway being managed by the gateway controller;
   negotiating a format for the media stream, wherein the media stream with a format unacceptable to the first entity is converted to an acceptable format by the gateway prior to forwarding the media stream to the first entity;
   the first entity invoking the gateway controller, via a path between the gateway controller, and the first entity that is separate from the data path carrying the media stream between the gateway and the first entity to cause the gateway to process the media stream received from the second entity;
   processing the media stream according to the negotiated formats; and
   sending the processed media stream on to the first entity.

2. The method of claim 1, wherein the session comprising the media stream, begins when a connection is established between the first and second entities and terminates when the connection ends and
   the step of configuring a service is performed by the first entity sending a service request from the first entity to the gateway controller.

3. The method of claim 2, wherein the service request includes necessary address information for the first entity for receiving the media stream.

4. The method of claim 2, wherein the media stream is a Global System for Mobile communications (GSM) voice stream, the voice stream being directed to the first entity via the IP network.

5. The method of claim 1, wherein the media stream is a video stream in Motion Pictures Expert Group (MPEG) format, wherein the media stream is directed to the first entity via the IP network and if the format of the media stream is unacceptable to the first entity the media stream is sent to the gateway for conversion before forwarding to the first entity.

6. The method of claim 1, further comprising the step of the first entity sending a service request to the gateway controller to configure the service for providing the media stream to the first entity.

7. The method of claim 2, wherein the service request includes the type of service requested.

8. The method of claim 2, further comprising the step of responding to the service request including address information associated with the gateway in the form of an IP address and a port number.

9. The method of claim 5 further comprising:
   processing the video stream by the gateway; and
   transferring the video stream from the gateway to the first entity.

10. The method of claim 4 further comprising transferring the voice stream, unmodified, over the IP network via the gateway between the second and first entity if the format of the voice stream provided by the second entity is acceptable to the first entity.

11. The method of claim 1, wherein the first entity is a mobile terminal and the second entity is one of a terminal and an end user serving terminal.

12. The method of claim 1, wherein the gateway is available for external control through the gateway controller via the known URI of the gateway controller.

13. A node, in a communications system that is coupled with an Internet Protocol (IP) network, for processing a media stream, the node comprising:
   a gateway controller, having a first IP address, for providing the media stream to a first entity;
   a gateway, having a second IP address and managed by the gateway controller, for processing the media stream;
   means for initiating the media stream for a session between the first entity and a second entity, with the first entity receiving, and the second entity sending the media stream over the IP network via a data path that includes the gateway;
   means for negotiating a format for the media stream between the first and second entities, wherein a media stream having a format unacceptable to the first entity is converted to an acceptable format by the gateway prior to forwarding the media stream to the first entity;
   means for receiving invoking signals from the first entity for the gateway controller, via a path between the gateway and the first entity that is separate from the data path carrying the media stream between the gateway and the first entity to cause the gateway to process the media stream received from the second entity on the data path;
   means for processing the media stream according to the negotiated format; and
   means for sending the media stream to the first entity via the data path.

14. The node of claim 13, wherein the session, comprising the media stream, begins when the connection is established between the first and second entities and terminates when the connection ends and
   the means for configuring the service for providing the media stream further comprises means in the gateway controller for receiving a service request sent by the first entity.

15. The node of claim 14, wherein the service request includes an address for receiving the media stream.

16. The node of claim 13, wherein the media stream is a Global System for Mobile communications (GSM) voice stream, the voice stream being directed to the first entity via the data path.

17. The node of claim 13, wherein the media stream is in Motion Pictures Expert Group (MPEG) format and is directed to the first entity via the IP network and if the format of the media stream in MPEG format is unacceptable to the first entity the media stream is sent to the gateway for conversion before forwarding to the first entity.

18. The node of claim 13, further comprising
   means for the gateway controller receiving the service request from the first entity to configure the service for providing the media stream to the first entity.

19. The node of claim 14, wherein the service request includes the type of service requested.

20. The node of claim 13 wherein the gateway controller further comprises
means for responding to the service request wherein the response includes address information associated with the gateway in the form of an IP address and a port number.

21. The node of claim 16, further comprising
means for transferring the media stream, unmodified, over the IP network via the gateway between the second and first entity, if the format of the media stream provided by the second entity is acceptable to the first entity.

22. The node of claim 13, wherein the first entity is a mobile terminal and the second entity is one of a terminal and an end user serving terminal.

23. The node of claim 13, wherein the gateway is available for external control through the gateway controller via the known URI of the gateway controller.

24. A communications system coupled with an Internet Protocol (IP) network for processing a media stream, the communication system comprising:
   a gateway controller having a first IP address for providing the media stream to a first entity;
   a gateway, having a second IP address and managed by the gateway controller, for processing the media stream;
   means for initiating the media stream for a session between the first entity and a second entity, with the first entity receiving, and the second entity sending the media stream over the IP network via a data path that includes the gateway;
   means for negotiating a format for the media stream between the first and second entities, wherein a media stream having a format unacceptable to the first entity is converted to an acceptable format by the gateway prior to forwarding the media stream to the first entity;
   means for receiving invoking signals from the first entity for the gateway controller, via a path between the gateway and the first entity that is separate from the data path, to cause the gateway to process the media stream between the gateway, and the first entity received from the second entity on the data path;
   means for processing the media stream according to the negotiated format; and
   means for sending the media stream to the first entity via the data path.

25. The communications system of claim 24, wherein the session, comprising the media stream, begins when the connection is established between the first and second entities and terminates when the connection ends and
   the means for configuring the service for providing the media stream further comprises means in the gateway controller for receiving a service request sent by the first entity.

26. The communications system of claim 25, wherein the service request includes an address for receiving the media stream.

27. The communications system of claim 24, wherein the media stream is a Global System for Mobile communications (GSM) voice stream, the voice stream being directed to the first entity via the data path.

28. The communications system of claim 24, wherein the media stream is in Motion Pictures Expert Group (MPEG) format and is directed to the first entity via the IP network and if the format of the media stream in MPEG format is unacceptable to the first entity the media stream is sent to the gateway for conversion before forwarding to the first entity.

29. The communications system of claim 24, further comprising
   receiver means for the gateway controller to receive the service request from the first entity to configure the service for providing the media stream to the first entity.

30. The communications system of claim 25, wherein the service request includes the type of service requested.

31. The communications system of claim 24 wherein the gateway controller further comprises
   means for responding to the service request wherein the response to the service request includes address information associated with the gateway in the form of an IP address and a port number.

32. The communications system of claim 24, further comprising
   means for transferring the media stream, unmodified, over the IP network via the gateway between the second and first entity, if the format of the media stream provided by the second entity is acceptable to the first entity.

33. The communications system of claim 24, wherein the first entity is a mobile terminal and the second entity is one of a terminal and an end user serving terminal.

34. The communications system of claim 24, wherein the gateway is available for external control through the gateway controller via the known URI of the gateway controller.

* * * * *

UNITED STATES PATENT AND TRADEMARK OFFICE
CERTIFICATE OF CORRECTION

PATENT NO. : 7,310,665 B2  Page 1 of 1
APPLICATION NO. : 09/837493
DATED : December 18, 2007
INVENTOR(S) : Holler et al.

It is certified that error appears in the above-identified patent and that said Letters Patent is hereby corrected as shown below:

In Column 2, Line 41, after "controller" delete "In" and insert -- in --, therefor.

In Column 2, Line 42, delete "continuing" and insert -- controlling --, therefor.

In Column 7, Line 12, in Claim 1, after "entity" delete ":" and insert -- ; --, therefor.

In Column 7, Line 33, in Claim 2, after "session" insert -- , --.

In Column 8, Line 3, in Claim 10, after "entity" insert -- , --.

Signed and Sealed this

Ninth Day of September, 2008

JON W. DUDAS
*Director of the United States Patent and Trademark Office*